(12) United States Patent
Hsu et al.

(10) Patent No.: US 10,769,504 B2
(45) Date of Patent: Sep. 8, 2020

(54) EXPANDING APPLIANCE FOR IMAGE IDENTIFYING MODULES AND EXPANDING METHOD FOR EXPANDING APPLIANCE

(71) Applicant: Chicony Power Technology Co., Ltd., New Taipei (TW)

(72) Inventors: Ting-Fu Hsu, New Taipei (TW); Jewel Tsai, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 239 days.

(21) Appl. No.: 16/001,939

(22) Filed: Jun. 7, 2018

(65) Prior Publication Data

US 2019/0286954 A1    Sep. 19, 2019

(30) Foreign Application Priority Data

Mar. 14, 2018  (TW) .............................. 107108712 A

(51) Int. Cl.
*G06K 9/78* (2006.01)
*G06T 7/33* (2017.01)
(Continued)

(52) U.S. Cl.
CPC ................. *G06K 9/78* (2013.01); *G06K 9/80* (2013.01); *G06T 7/33* (2017.01); *G09G 5/003* (2013.01);
(Continued)

(58) Field of Classification Search
CPC ... G06K 9/78; G06K 9/80; G06T 7/33; G09G 2360/06; G09G 5/003; H04N 1/00241; H04N 1/00538; H04N 7/18; H04N 7/183
See application file for complete search history.

(56) References Cited

U.S. PATENT DOCUMENTS 6,587,129 B1   7/2003 Lavendel et al.
7,558,408 B1   7/2009 Steinberg et al.
(Continued)

FOREIGN PATENT DOCUMENTS

CN        1983303 A     6/2007
CN      201967050 U     9/2011
(Continued)

OTHER PUBLICATIONS

Search Report dated Feb. 12, 2019 of the corresponding European patent application No. EP18179441.3.
(Continued)

*Primary Examiner* — Nirav G Patel
(74) *Attorney, Agent, or Firm* — Chun-Ming Shih; HDLS IPR Services

(57) ABSTRACT

An expanding appliance includes a connect port, an image capturing module, an intelligent control module, an image transmitting module, and a result displaying module. The expanding appliance connects an image input device through the connect port, connects a display device through the result displaying module, and connects one or more image-applied function module through the image transmitting module. The intelligent control module generates a demanding command according to a successfully-connected image-applied function module. The image capturing module controls the image input device to capture image data based on the demanding command, and quantizes samples of the image data as computation data. The image transmitting module provides the computation data to the image-applied function module for image identification and receives an identification result. Finally, the intelligent control module triggers the result display module for displaying the identification result on the display device.

20 Claims, 9 Drawing Sheets

(51) Int. Cl.
  *G06K 9/80* (2006.01)
  *H04N 1/00* (2006.01)
  *H04N 7/18* (2006.01)
  *G09G 5/00* (2006.01)

(52) U.S. Cl.
  CPC ..... *H04N 1/00241* (2013.01); *H04N 1/00538* (2013.01); *H04N 7/18* (2013.01); *H04N 7/183* (2013.01); *G09G 2360/06* (2013.01)

(56) References Cited

U.S. PATENT DOCUMENTS

| | | | |
|---|---|---|---|
| 10,013,633 B1* | 7/2018 | Manmatha | G06K 9/00885 |
| 2003/0233667 A1 | 12/2003 | Umipig et al. | |
| 2008/0267514 A1 | 10/2008 | Alasia et al. | |
| 2013/0162817 A1 | 6/2013 | Bernal | |
| 2013/0169873 A1 | 7/2013 | Lee et al. | |
| 2013/0174042 A1 | 7/2013 | Kim et al. | |
| 2013/0258195 A1 | 10/2013 | Chung et al. | |

FOREIGN PATENT DOCUMENTS

| | | |
|---|---|---|
| CN | 103456057 A | 12/2013 |
| CN | 104243930 A | 12/2014 |
| CN | 204926080 U | 12/2015 |
| CN | 205123855 U | 3/2016 |
| CN | 107196861 A | 9/2017 |
| TW | 200929086 A | 7/2009 |
| TW | 201312479 A | 3/2013 |
| TW | M542834 U | 6/2017 |

OTHER PUBLICATIONS

Office Action dated Jul. 5, 2018 of the corresponding Taiwan patent application No. 107108712.

* cited by examiner

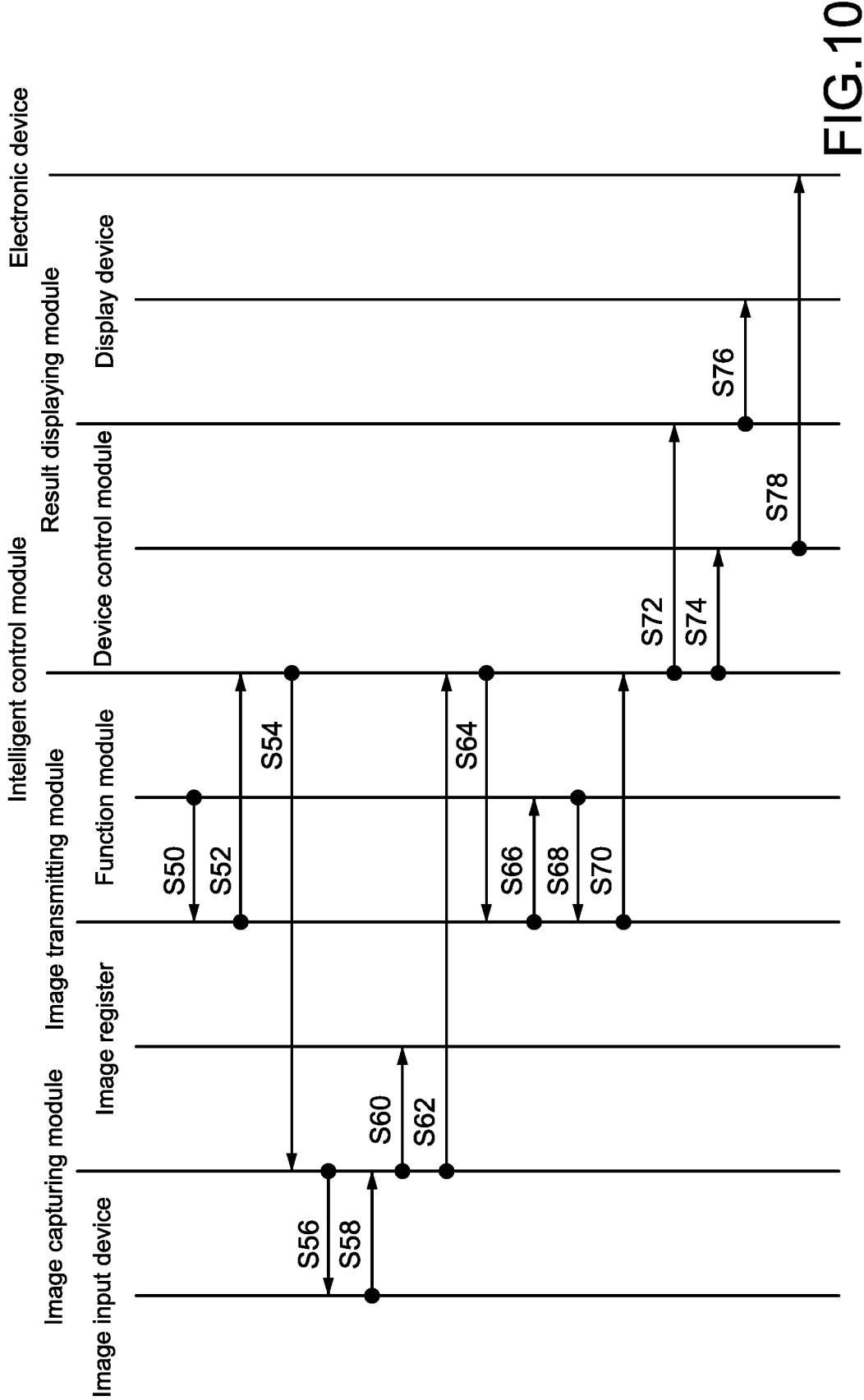

EXPANDING APPLIANCE FOR IMAGE IDENTIFYING MODULES AND EXPANDING METHOD FOR EXPANDING APPLIANCE

BACKGROUND OF THE INVENTION

1. Technical Field

The technical relates to the image identification, and specifically relates to an expanding appliance for image identifying modules, and an expanding method for the expanding appliance.

2. Description of Related Art

Following the development of technology, there are many kinds of image identification technology being released in the market, which may identify and analyze captured images through image identification algorithms for obtaining corresponding information. The most common image identification technologies in the market may be, for example, human face identification, human traffic counting, behavior detection, etc.

Due to the extremely huge data volume and computing amount consumed for executing the image identification algorithms, the well-known identification systems in the market are all concentrated on single identification function. If a system has to simultaneously execute multiple different types of image identification algorithms (such as human face identification, human traffic counting, etc.), the hardware specification of the system, including computing speed and memories all have to be updated. Furthermore, the developers of the system have to ensure what types of the image identification functions are that have to be initially embedded in the system at the beginning, so as to settle the hardware specification of the system down.

However, even if an identification system capable of multiple types of image identification functions is developed, when one or more additional image identification functions are demanded by the client to be added to the system, the computation loading of the system will very likely exceed the capacity that the hardware can take and reduces its identification efficiency. Otherwise, if one or more image identification functions of such system are demanded to be withdrawn, the hardware of the system will be too expansive for the real demand and causes a waste of cost.

For taking both the cost of the hardware and the efficiency of executing the image identification of such system into account, and making such system to be able to flexibly fulfill to client's requirement (for example, the client originally needs a human face identification function only, but wants to add a human traffic counting function afterward), a newly image identification system which may real-time expand its identification function without affecting its hardware is needed, and such system may also increase the develop efficiency of the developers.

SUMMARY OF THE INVENTION

The invention is directed to an expanding appliance for image identifying modules and an expanding method for the expanding appliance, which may expand and connect one or more function modules respectively responsible for performing different types of image identification technology, so as to simultaneously execute one or more types of image identification functions and obtain different types of identified results, neither slowing down the hardware performance nor affecting the identification efficiency.

In one of the exemplary embodiments of the present invention, the expanding appliance may be used for expanding the identification function of an image input device, and comprises:

a connect port, connected with the image input device which is configured to capture an image data;

an image register;

an image capturing module, connected with the connect port and the image register, configured to sample the image data captured by the image input device for producing samples and to quantize the samples as at least one computation data, and configured to store the computation data to the image register;

an image transmitting module, connected with the image register and at least one function module, wherein the function module having an independent computing unit and being configured to execute a unique image identification procedure;

an intelligent control module, connected with the image capturing module and the image transmitting module, configured to generate a demanding command corresponding to the function module after the function module is connected to the image transmitting module, and configured to control the image capturing module according to the demanding command; and a result displaying module, connected with the intelligent control module;

wherein the image transmitting module is configured to receive an identified result generated by the function module via executing the image identification procedure according to the computation data, and the image transmitting module is configured to convey the identified result to the intelligent control module for the intelligent control module to trigger the result displaying module for displaying the identified result.

In another one of the exemplary embodiments of the present invention, the expanding appliance is used for expanding controlling function of an image input device, and comprises:

a connect port, connected with the image input device which configured to capture an image data;

an image register;

am image capturing module, connected with the connect port and the image register, configured to sample the image data captured by the image input device for producing samples and to quantize the samples as at least one computation data, and configured to store the computation data to the image register;

an image transmitting module, connected with the image register and at least one function module, wherein the function module having an independent computing unit and being configured to execute a unique image identification procedure;

an intelligent control module, connected with the image capturing module and the image transmitting module, configured to generate a demanding command corresponding to the function module after the function module is connected to the image transmitting module, and configured to control the image capturing module according to the demanding command; and a device control module, connected with the intelligent control module and at least one electronic device;

wherein the image transmitting module is configured to receive an identified result generated by the function module via executing the image identification procedure according to the computation data, and configured to convey the identified result to the intelligent control module, and the intelligent control module is configured to generate a control command according to the identified result and uses the control command to trigger the device control module correspondingly controlling the electronic device.

In another one of the exemplary embodiments of the present invention, the expanding method is adopted by the aforementioned expanding appliances and comprises following steps:

a) connecting at least one function module through the image transmitting module;

b) generating a demanding command corresponding to the function module by the intelligent control module after the function module is connected to the image transmitting module, wherein the function module executes a unique image identification procedure by an independent computing unit;

c) controlling the image input device to obtain an image data by the image capturing module according to the demanding command;

d) sampling the image data for producing samples and quantizing the samples as at least one computation data, and storing the computation data to the image register by the image capturing module;

e) obtaining the computation data from the image register and transmitting the computation data to the function module by the image transmitting module;

f) receiving an identified result generated by the function module via executing the image identification procedure according to the computation data by the image transmitting module; and g) receiving the identified result from the image transmitting module at the intelligent control module, and triggering the result displaying module according to the identified result for the result displaying module to display the identified result.

In comparison with the related art, the expanding appliance of the present invention may expand and connect one or more function modules through the intellectual function for simultaneously performing multiple types of image identification procedures, neither slowing down the hardware performance nor affecting the identification efficiency. Also, the expanding appliance may, due to the real demand of the users, arbitrarily connect with different combinations of function modules, so as to perform image identification procedures and provide the identified results which are more adequate and related to the real demand of the users.

BRIEF DESCRIPTION OF THE DRAWINGS

FIG. 10 is a first embodiment of an operation timing diagram of the present invention.

DETAILED DESCRIPTION OF THE INVENTION

In cooperation with the attached drawings, the technical contents and detailed description of the present invention are described thereinafter according to multiple embodiments, being not used to limit its executing scope. Any equivalent variation and modification made according to appended claims is all covered by the claims claimed by the present invention.

Figure 1:
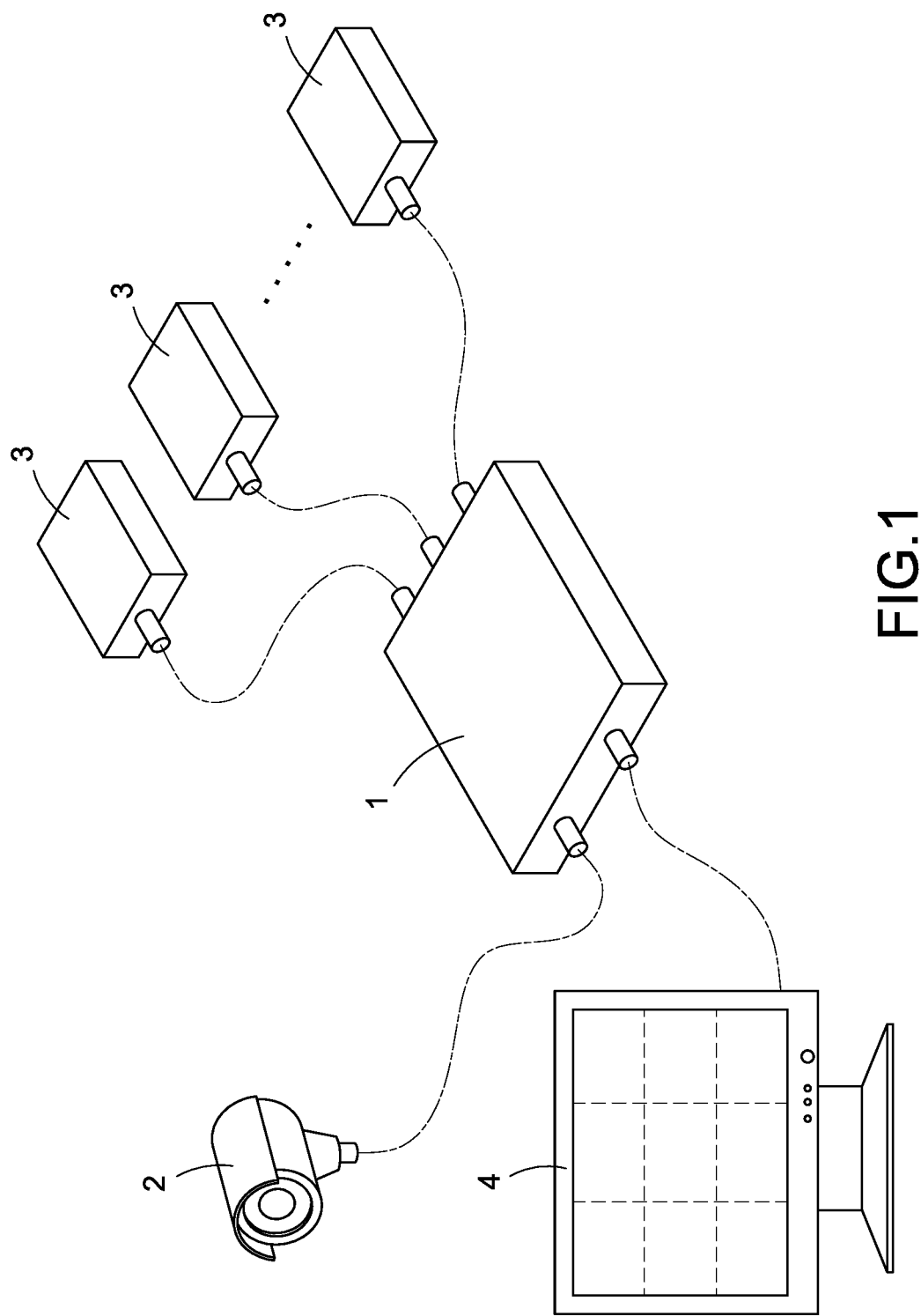
FIG. 1 is a first embodiment of a schematic diagram showing an expanding appliance of the present invention.

FIG. 1 is a first embodiment of a schematic diagram showing an expanding appliance of the present invention. FIG. 1 discloses an expanding appliance for image identifying modules (referred to as the expanding appliance 1 hereinafter), the expanding appliance 1 may be connected with an external image input device 2, and may be connected with one or more external image-applied function modules 3 (referred to as the function module 3). In the embodiment, the image input device 2 is a camera, but not limited thereto.

One of the major technical features of the present invention is that the expanding appliance 1 may receive images captured by the image input device 2 and provide the received images to the one or more function modules 3 connected therewith for respectively performing an image identification procedure. Each of the function modules 3 may respectively execute its image identification procedure and transmit its identified result back to the expanding appliance 1 after finishing the image identification procedure (in the invention, each of the function modules 3 is respectively executing different types of the image identification procedure).

In the present invention, the capturing actions of the images are performed by the image input device 2, and the identification actions of the images are respectively performed by each of the function modules 3. The expanding appliance 1 integrates the image input device 2 and the function modules 3 and provides each function module 3 with its demanding image respectively. As a result, even if a user is requesting multiple different types of identification functions simultaneously, it won't cause the problem that the loading of the expanding appliance 1 is too high to be taken by the hardware and results in reducing the image identification efficiency and accuracy of the expanding appliance 1.

In the embodiment shown in FIG. 1, the expanding appliance 1 is further connected with an external display device 4. The expanding appliance 1 may display the identified result of each function module 3 through the display device 4. For a first example, the function modules 3 may include a human face identification function module, and the identified result generated by this function module 3 may be the name of a person presented in the image. For a second example, the function modules 3 may include a human traffic counting function module, and the identified result generated by this function module 3 may be the total amount of the persons presented in the image. For a third example, the function modules 3 may include a behavior detecting function module, and the identified result generated by this function module 3 may be the behavior description of the person presented in the image. For a fourth example, the function modules 3 may include a license plate identification function module, and the identified result generated by this function module 3 may be the license plate number of a car presented in the image. For a fifth example, the function modules 3 may include a plant identification function module, and the identified result generated by this function module 3 may be the variety name of a plant presented in the image.

It should be noted that the expanding appliance 1 may display the identified result of each function module 3 respectively through the connected display device 4 (as shown in FIG. 1, the monitor of the display device 4 may be logically segmented into several display blocks for respectively displaying each of the identified results), and the expanding appliance 1 may also integrate multiple identified results of the multiple function modules 3 which are application-reference (details discussed in the following), and display an integrated identified result through the display device 4. Therefore, the user of the expanding appliance 1 may obtain, from the display device 4, image identified results which are more adequate, more informative, and more close to the user's real demand.

Figure 2:
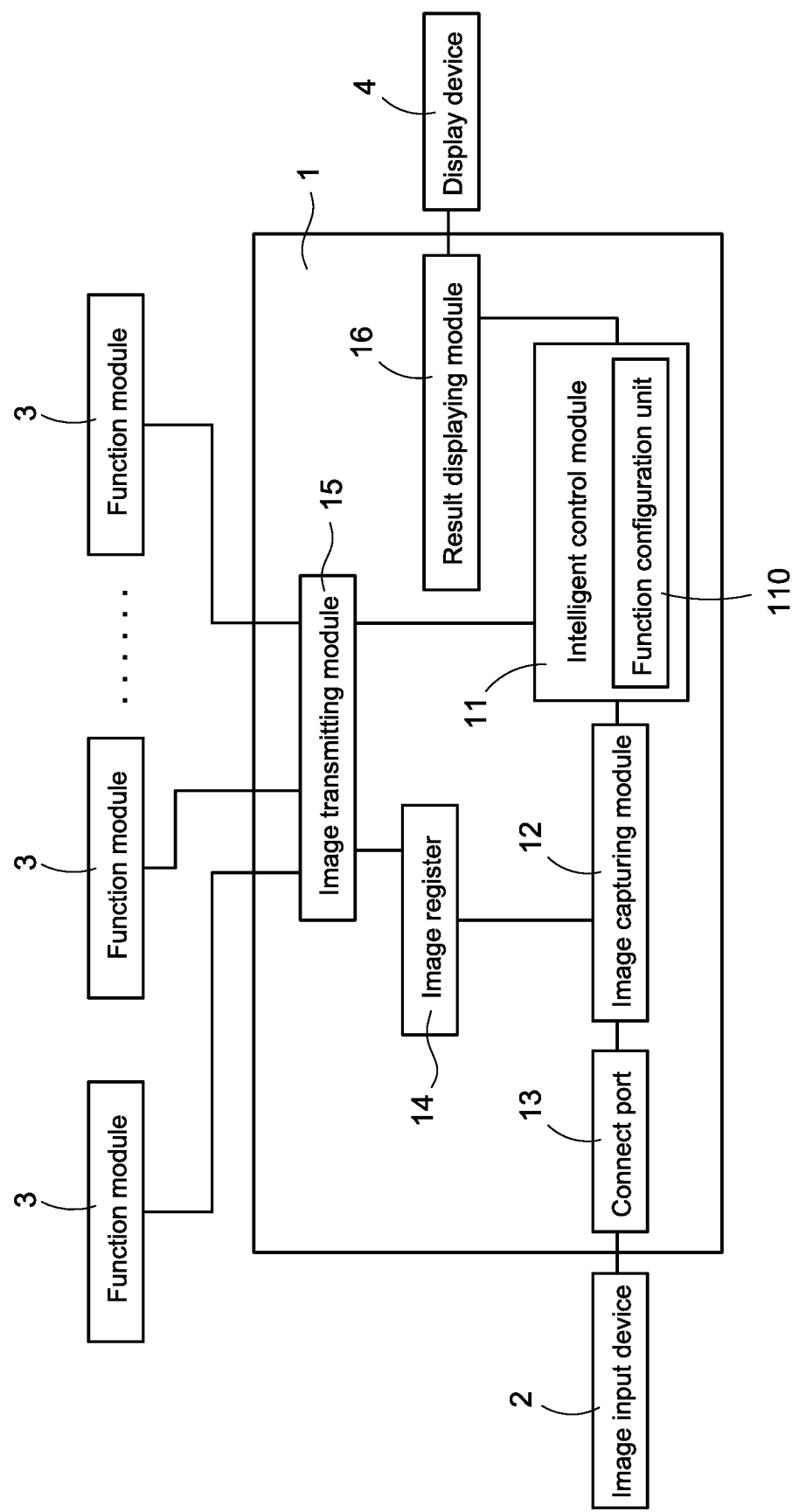
FIG. 2 is a first embodiment of a block diagram showing the expanding appliance of the present invention.

FIG. 2 is a first embodiment of a block diagram showing the expanding appliance of the present invention. As shown in FIG. 2, the expanding appliance 1 in the embodiment mainly includes an intelligent control module 11, an image capturing module 12, a connect port 13, an image register 14, an image transmitting module 15, and a result displaying module 16.

The expanding appliance 1 is connected with an external image input device 2 through the connect port 13 for obtaining the image data captured by the image input device 2. In the embodiment, the expanding appliance 1 may be embedded with single one connect port 13 for connecting the single one image input device 2, and perform one or more types of image identification procedures on the image data captured by the image input device 2 through one or more function modules 3 connected thereto, so as to obtain one or more different types of identified results (such as the name of the person, the total amount of the persons, the license plate number, etc. discussed above).

The image register 14 is a storage that is used for temporarily storing the image data captured by the image input device 2. In the embodiment shown in FIG. 2, the expanding appliance 1 is arranged with single one image register 14, but it may also be arranged with multiple image registers 14 depending on the real demand, not limited thereto. For example, the expanding appliance 1 may be arranged with multiple image registers 14 for expanding its storage volume, or for separately storing the image data of different resolutions. For the sake of understanding, a single one image register 14 in the embodiment will be taken into account for further discussion in the following.

The image capturing module 12 is connected with the connect port 13 and the image register 14. In the embodiment, the image capturing module 12 controls the image input device 2 to start/stop capturing the aforementioned image data based on commands of the expanding appliance 1, and the image capturing module 12 quantizes samples of the image data as computation data and stores the computation data to the image register 14. In particular, the image capturing module 12 may perform image pre-process (such as image extraction process, color conversion process, etc.) on the image data captured by the image input device 2, and the computation data stored in the image register 14 will be the data that can be computed, identified directly by each of the function modules 3, therefore, the identification performance of the function modules 3 connected with the expanding appliance 1 will be effectively improved.

The image transmitting module 15 is connected with the image register 14, and the image transmitting module 15 obtains the processed computation data from the image register 14. The expanding appliance 1 is correspondingly connected with one or more function modules 3 through the image transmitting module 15. In the present invention, the one or more function modules 3 may respectively have an independent computing unit (such as a central process unit (CPU) or a microprocessor), and each function module 3 is respectively executing its unique image identification procedure through its computing unit.

More specific, each computing unit of each function module 3 has a unique image identification algorithm, which is used for performing different types of image identification procedure through the hardware of the function module 3. If the expanding appliance 1 is connected with one function module 3, then only one type of identified result will be presented. If the expanding appliance 1 is connected with two function modules 3, then two different types of identified results will be presented eventually, and so on.

The intelligent control module 11 is connected with the image capturing module 12 and the image transmitting module 15. In the embodiment, the intelligent control module 11 may recognize the one or more function modules 3 which are currently successfully connected to the image transmitting module 15. The intelligent control module 11 may generate a demanding command corresponding to the currently connected function module(s) 3, and control the image capturing module 12 according to the generated demanding command.

In the present invention, the image capturing module 12 is mainly controlling the image input device 2 based on the demanding command sent by the intelligent control module 11, for example, the image capturing module 12 may set the captured parameters (such as resolution, frame rate, etc.) of the image input device 2 so as to ensure that the image data captured by the image input device 2 can satisfy the identification demand of the function module(s) 3 which is/are currently connected.

For example, if the expanding appliance 1 is connected with the human face identification function module (which needs the image data of high resolution/low frame rate), the intelligent control module 11 will generate the demanding command according to the identification demand of the human face identification function module, and the image capturing module 12 will control the image input device 2 to capture the image data of high resolution/low frame rate according to the demanding command.

If the expanding appliance 1 is simultaneously connected with the human face identification function module and the human traffic counting function module (which needs the image data of low resolution/high frame rate), the intelligent control module 11 will generate the demanding command according to the identification demands of both the human face identification function module and the human traffic counting function module. In this embodiment, the image capturing module 12 will control the image input device 2 to capture the image data of high resolution/high frame rate according to the demanding command, and then respectively drop the resolution and the frame rate of the captured image data for generating a duplicated image data of high resolution/low frame rate and another duplicated image data of low resolution/high frame rate.

As mentioned above, the expanding appliance 1 of the present invention may recognize the successfully connected function modules 3 through the intelligent control module 11 and adjust the captured parameters of the image input device 2 based on the identification demand of the function modules 3 through the image capturing module 12; therefore, the expanding appliance 1 can ensure that the image data captured by the single one image input device 2 may simultaneously satisfy different identification demands of different function modules 3, and the expanding appliance 1 may implement the technical solution of the present invention by only connecting the single one image input device 2.

The result displaying module 16 is connected with the intelligent control module 11, and the expanding appliance 1 is connected with the external display device 4 through the result displaying module 16. In particular, the expanding appliance 1 provides the computation data stored in the image register 14 to the one or more function modules 3 through the image transmitting module 15, so as to make each of the function modules 3 to respectively execute its image identification procedure. After each of the function modules 3 completes its image identification procedure, the expanding appliance 1 may respectively receive the identified result from each function module 3 through the image transmitting module 15. In this embodiment, the image transmitting module 15 is mainly conveying the received identified results to the intelligent control module 11, and the intelligent control module 11 may trigger the result displaying module 16 according to the identified results for displaying the identified results on the display device 4.

By way of the technical solution of the present invention, the users may connect one or more function modules 3 to the expanding appliance 1 according to real demand, and make the expanding appliance 1 to simultaneously display the identified result(s) of the one or more connected function module(s) 3 through the display device 4, which is very convenient.

Figure 3:
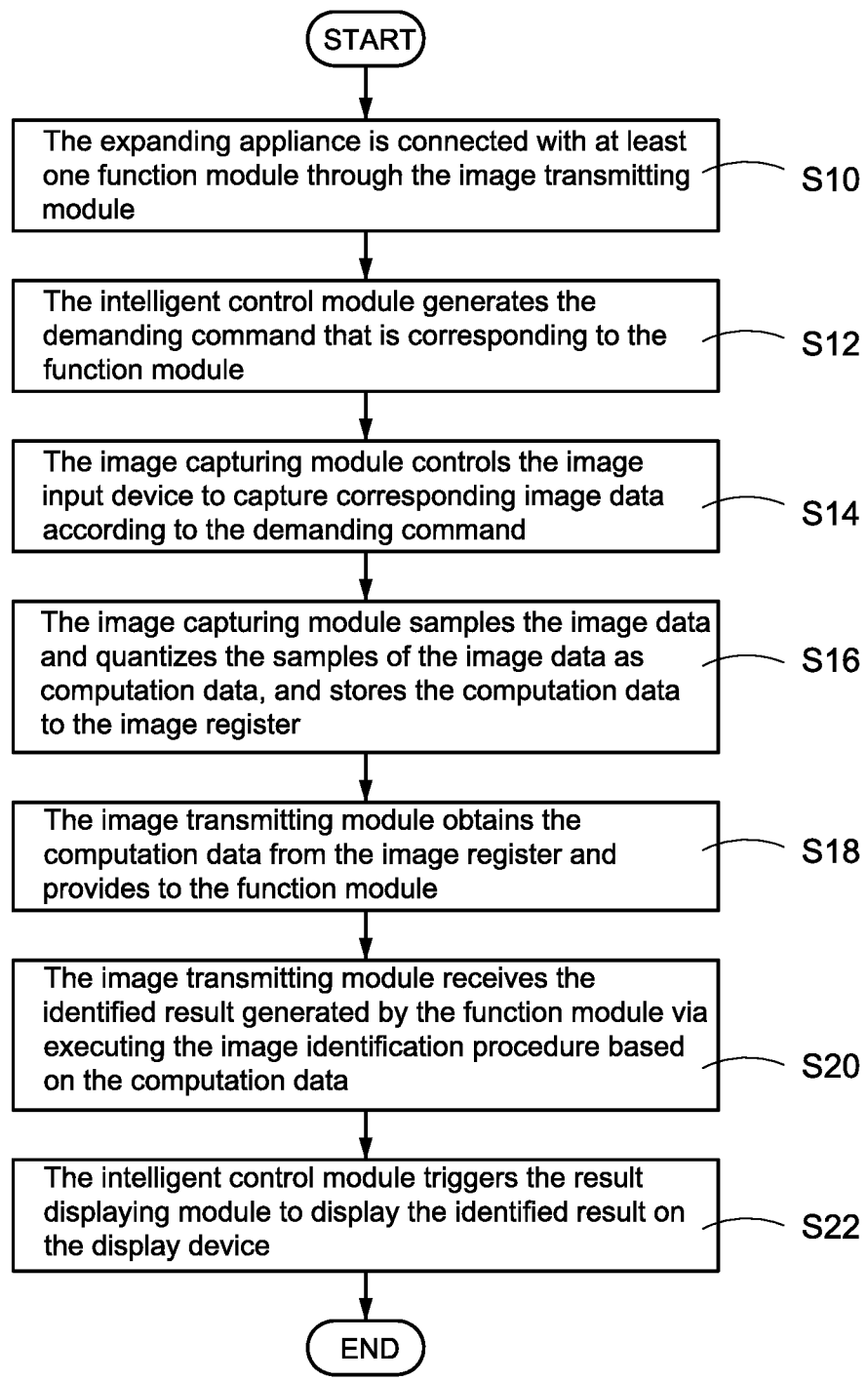
FIG. 3 is a first embodiment of a flowchart showing an expanding method of the present invention.

FIG. 3 is a first embodiment of a flowchart showing an expanding method of the present invention. FIG. 3 discloses an expanding method of the present invention, which is basically adopted by the expanding appliance 1 as shown in FIG. 1 and FIG. 2.

As shown in FIG. 3, for adopting the expanding method of the present invention, the expanding appliance 1 is firstly connected with at least one function module 3 (step S10). In particular, the image transmitting module 15 is arranged with at least one input/output slot (such as a USB connector, a HDMI-CEC connector, etc., not shown in the FIGs), and the expanding appliance 1 is connected with the function module 3 through the input/output slot of the image transmitting module 15. For the sake of understanding, the following description will take single one function module 3 connected therewith as an example.

After the function module 3 is connected to the image transmitting module 15 (assuming that the function module 3 is already powered and activated), the intelligent control module 11 may generate the demanding command that is corresponding to the connected function module 3 (step S12). In this embodiment, the function module 3 is connected and used for executing its unique image identification procedure through its independent computing unit, and the demanding command is generated to indicate the image specifications (such as resolution, frame rate, etc.) requested by the function module 3 for executing the image identification procedure. It should be noted that, if the image transmitting module 15 is simultaneously connected with multiple function modules 3, the demanding command generated by the intelligent control module 11 will be indicating multiple different image specifications respectively requested by each of the function modules 3 for executing their own image identification procedure.

After the step S12, the image capturing module 12 may control the image input device 2 to capture corresponding image data according to the demanding command generated by the intelligent control module 11 (step S14). Next, the image capturing module 12 may sample the image data for producing samples of the image data, and quantize the samples of the image data as computation data (the image capturing module 12 may perform the image pre-process on the image data), and further store the computation data to the image register 14 (step S16).

After the step S16, the image capturing module 12 may notify the intelligent control module 11 that the computation data is temporarily stored in the image register 14, so the intelligent control module 11 may allow the image transmitting module 15 to start performing data communicating actions. In particular, the image transmitting module 15 is obtaining the computation data from the image register 14 and providing the obtained computation data to the connected function module 3 (step S18). The function module 3 may receive the computation data from the image transmitting module 15 of the expanding appliance 1, so as to execute its image identification procedure based on the received computation data.

After the image identification procedure of the function module 3 is completed, the expanding appliance 1 may receive the identified result of the image identification procedure which is executed based on the computation data from the function module 3 through the image transmitting module 15 (step S20). Next, the image transmitting module 15 may convey the received identified result to the intelligent control module 11; therefore, the intelligent control module 11 may trigger the result displaying module 16 according to the identified result (step S22), so as to display the identified result on the display device 4.

In one embodiment, the image transmitting module 15 is simply conveying the identified result of the function module 3 to the intelligent control module 11 for the result displaying module 16 to display the identified result on the display device 4. In another embodiment, the image transmitting module 15 may first perform a filtering procedure on the identified result (for example, only keeps parts of the identified result that have an identification accuracy within an effective range), and only conveys the filtered identified result to the intelligent control module 11; therefore, the working load of the intelligent control module 11 will be decreased. In a further embodiment, the image transmitting module 15 may perform a further determination on the identified result, and notify the intelligent control module 11 to display a warning on the display device 4 whenever the content of the identified result is representing an abnormal situation. However, the above descriptions are only parts of the exemplary embodiments, but not intended to limit the scope of the present invention.

In using the expanding method of the present invention, the users may get one identified result on the display device 4 once they connect only one function module 3 to the expanding appliance 1, and may get two different types of identified result on the display device 4 once they connect two different function modules 3 to the expanding appliance 1, and so on. Accordingly, the users may use a lowest hardware specification to simultaneously perform multiple self-selected image identification procedures without affecting the identification efficiency and accuracy, so as to improve the flexibility and convenience of the image identification procedures.

Figure 4:
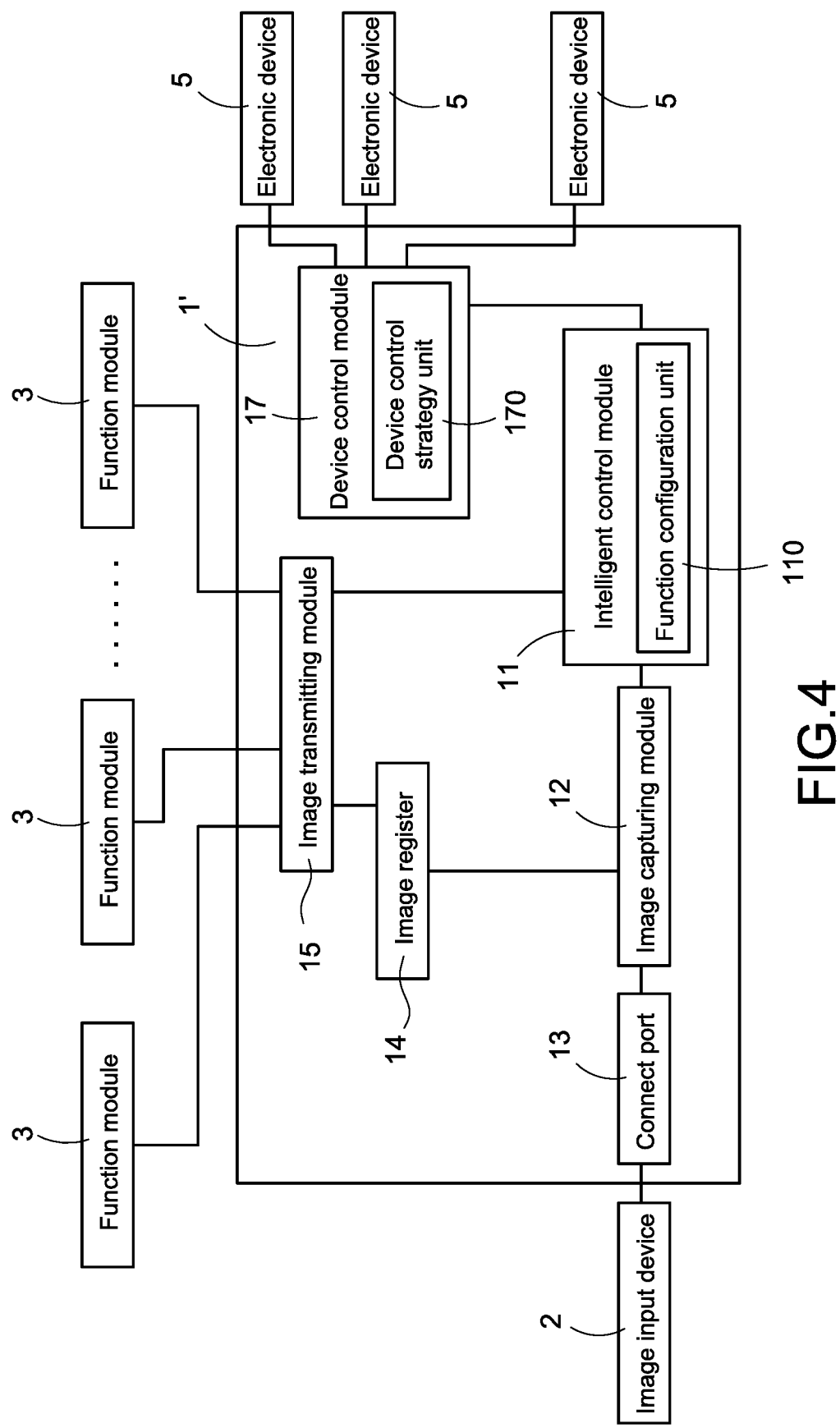
FIG. 4 is a second embodiment of a block diagram showing the expanding appliance of the present invention.

FIG. 4 is a second embodiment of a block diagram showing the expanding appliance of the present invention.

FIG. 4 discloses another expanding appliance for image identifying modules (referred to as the expanding appliance 1' hereinafter). The expanding appliance 1' in the second embodiment is similar to the expanding appliance 1 in the first embodiment, which is internally arranged with the intelligent control module 11, the image capturing module 12, the connect port 13, the image register 14, and the image transmitting module 15. The expanding appliance 1' is connected with an external image input device 2 through the connect port 13, and connected externally with one or more function modules 3 through the image transmitting module 15. The difference between the expanding appliance 1 in the first embodiment and the expanding appliance 1' in the second embodiment is that the expanding appliance 1' here further includes a device control module 17 which is connected with the intelligent control module 11.

As shown in FIG. 4, the expanding appliance 1' is connected externally with one or more electronic devices 5 through the device control module 17. Similar to the aforementioned expanding appliance 1 of the first embodiment, the expanding appliance 1' here may provide the computation data temporarily stored in the image register 14 to the connected one or more function modules 3 through the image transmitting module 15, and receive the identified result of each function module 3 through the image transmitting module 15. In this embodiment, the intelligent control module 11 may receive the identified result of each function module 3 from the image transmitting module 15, generate a corresponding control command according to the received identified results, and trigger the device control module 17 through the control command, so the device control module 17 may correspondingly control the connected one or more electronic devices 5.

For example, the connected function module 3 may be the human traffic counting function module, and the connected electronic device 5 may be an air-conditioning. When the function module 3 identifies the computation data and determines that the total amount of person presented therein exceeds a default amount, the intelligent control module 11 will generate a corresponding control command for triggering the device control module 17 to activate the air-conditioning. For another example, the connected function module 3 may be the license plate identification function module, and the connected electronic device 5 may be a gate of a parking lot. When the function module 3 identifies the computation data and determines that the license plate number of a car present therein is a registered number, the intelligent control module 11 will generate a corresponding control command for triggering the device control module 17 to open the gate of the parking lot.

It should be noted that if the expanding appliance 1' is simultaneously connected with, through the device control module 17, multiple electronic devices 5 which are having interaction, the intelligent control module 11 may be triggered to simultaneously control the multiple electronic devices 5 according to the identified result of the function module 3 (for example, when the function module 3 recognized that the person presented in the image is an employee of the company, the device control module 17 may simultaneously open the gate and turn on the lights).

The expanding appliance 1 shown in FIG. 2 is arranged with the result displaying module 16 for connecting the external display device 4, and the expanding appliance 1' shown in FIG. 4 is arranged with the device control module 17 for connecting the external electronic device(s) 5. In another embodiment, the expanding appliances 1, 1' may be simultaneously arranged with the aforementioned result displaying module 16 and device control module 17, so as to simultaneously connect the display device 4 and the electronic device(s) 5; therefore, the expanding appliances 1, 1' may display the identified result of each function module 3 on the display device 4 in company with controlling the connected electronic device(s) 5 correspondingly.

Figure 5:
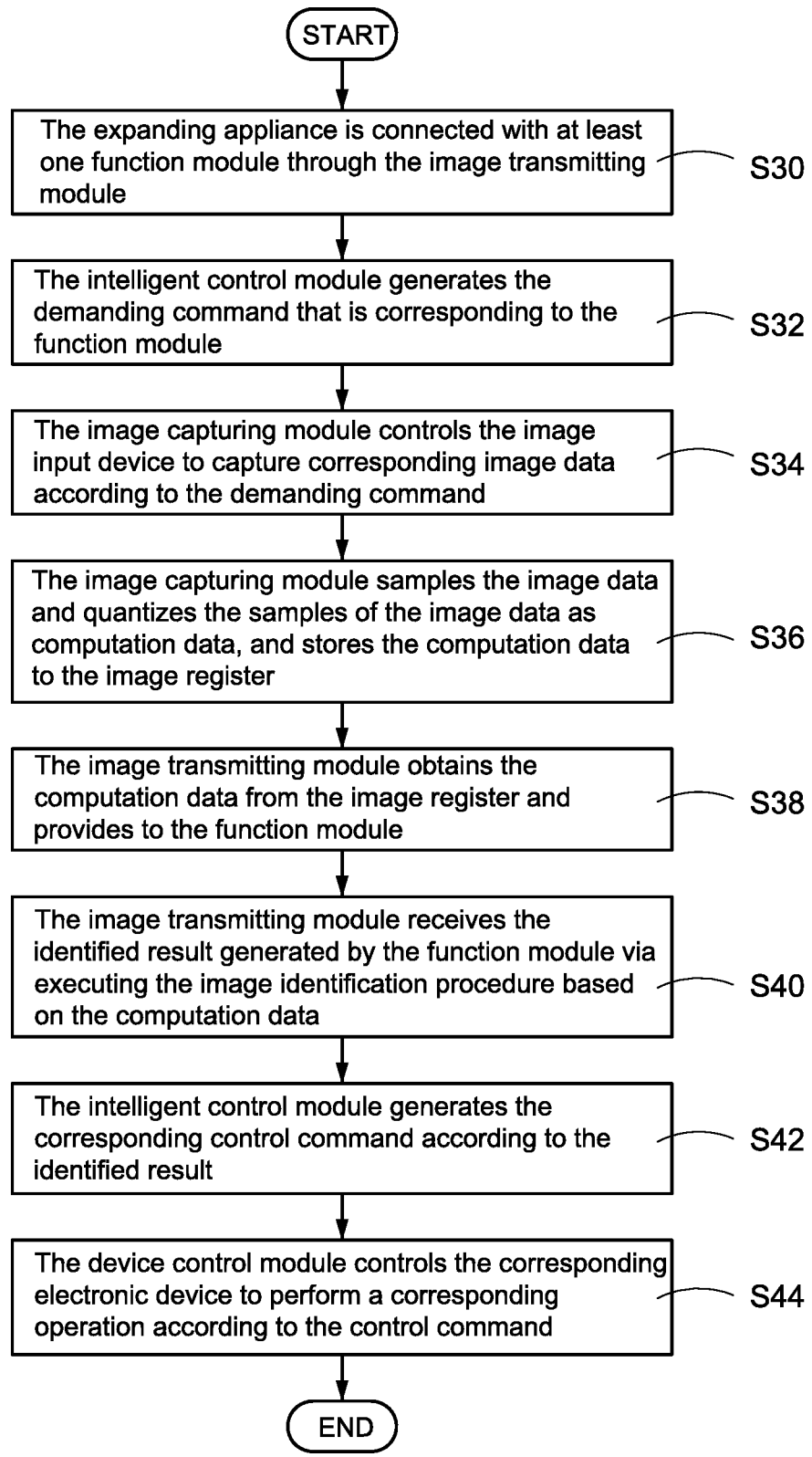
FIG. 5 is a second embodiment of a flowchart showing the expanding method of the present invention.

FIG. 5 is a second embodiment of a flowchart showing the expanding method of the present invention. FIG. 5 discloses another expanding method adopted by the expanding appliance 1' as shown in FIG. 4. First, the expanding appliance 1' is connected with at least one function module 3 through the image transmitting module 15 (step S30). After the function module 3 is connected to the image transmitting module 15, the intelligent control module 11 generates a corresponding demanding command (step S32). Next, the image capturing module 12 controls the image input device 2 to capture the corresponding image data according to the demanding command (step S34).

Next, the image capturing module 12 samples the image data for producing samples and quantizes the samples of the image data as computation data, and further stores the computation data to the image register 14 (step S36). Next, the image transmitting module 15 obtains the computation data from the image register 14 and provides the computation data to the successfully-connected function module 3 (step S38). After receiving the computation data, the function module 3 executes its image identification procedure based on the computation data. Next, the expanding appliance 1' receives the identified result of the image identification procedure executed by the function module 3 through the image transmitting module 15 (step S40).

In particular, the above step S30 to step S40 are same or similar to the aforementioned step S10 to step S20 shown in FIG. 3, the detailed description here is omitted.

After the step S40, the intelligent control module 11 may receive the identified result of each function module 3 from the image transmitting module 15, and generates the corresponding control command according to the received identified result (step S42). Next, the intelligent control module 11 may trigger the device control module 17 according to the control command, so the device control module 17 may control the corresponding electronic device 5 to perform a corresponding operation according to the content of the control command (step S44).

As described above, the expanding appliances 1, 1' in the present invention may alternatively include the result displaying module 16 or the device control module 17, or include the result displaying module 16 and the device control module 17 at the same time, not limited thereto. For easily understanding the technical solution of the present invention, an expanding appliance 1 arranged with both the result displaying module 16 and the device control module 17 will be taken as a main example in the following.

Figure 6:
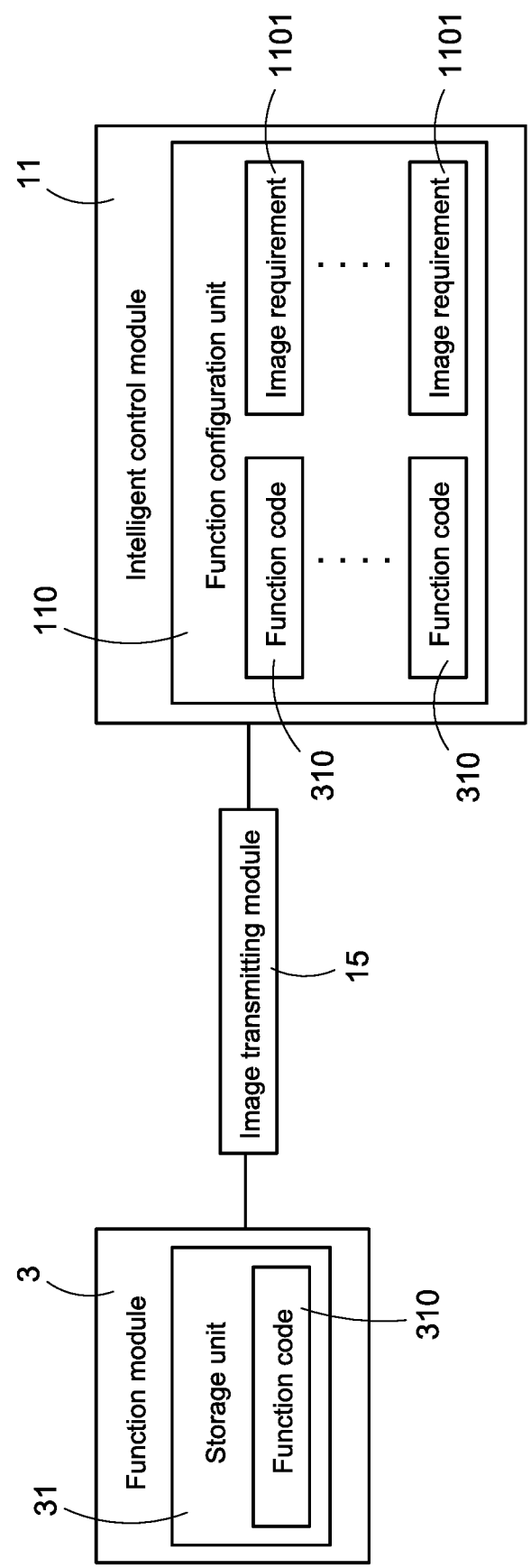
FIG. 6 is a third embodiment of a block diagram showing the expanding appliance of the present invention.

FIG. 6 is a third embodiment of a block diagram showing the expanding appliance of the present invention. As shown in FIG. 6, the function module 3 has a storage unit 31, the storage unit 31 records a function code 310 of the function module 3, wherein the function code 310 corresponds to the type of the image identification procedure supported by the function module 3. For example, if the function module 3 is the human face identification function module, the function code 310 stored in the storage unit 31 may be "0101", if the function module 3 is the human traffic counting function module, the function code 310 stored in the storage unit 31 may be "0102", and so forth. When one function module 3 is successfully connected to the image transmitting module 15, the intelligent control module 11 may recognize the identity of the function module 3 according to the function code 310 of the function module 3 (i.e., determines what type of the image identification procedure is supported by the function module 3), so as to generate the demanding command corresponding to the function module 3.

As shown in FIG. 6, the intelligent control module 11 of the expanding appliance 1 includes a function configuration unit 110, the function configuration unit 110 records a function code 310 and an image demand of all function modules 3 that can be supported by the expanding appliance 1. In this embodiment, the image demand indicates the image specification (such as resolution, frame rate, etc.) requested by each of the function modules 3 for executing its own image identification procedure.

In the aforementioned embodiments (such as the step S12 in FIG. 3 or the step S32 in FIG. 5), the intelligent control module 11 obtains the function code 310 of the function module 3 after the function module 3 is successfully connected to the image transmitting module 15, and the intelligent control module 11 inquiries the function configuration unit 110 with the function code 310 for obtaining a corresponding image requirement 1101 (such as high resolution/low frame rate, low resolution/high frame rate, etc.), and generates the aforementioned demanding command based on the obtained image requirement 1101. Therefore, after receiving the demanding command from the intelligent control module 11, the image capturing module 12 may control the image input device 2 according to the demanding command for making the image input device 2 to capture the image data that is satisfying the image requirement 1101 of the function module 3.

By implementing the technical solution of the present invention, when the users are willing to increase the categories of the function modules 3 that are supported by the expanding appliance 1, all they have to do is easily performing settings on the function configuration unit 110 for adding the function code 310 and the image requirement 1101 of new function module(s) 3 to the function configuration unit 110, thus may greatly improve the convenience and flexibility of using the expanding appliance 1.

In should be noted that the expanding appliance 1 may be connected with multiple function modules 3 through the image transmitting module 15, each of the function modules 3 respectively supports different type of image identification procedure and has different content of function code 310. As mentioned above, the function configuration unit 110 may record the function code 310 and the image requirement 1101 of each function module 3. If the expanding appliance 1 is simultaneously connected with multiple function modules 3, the intelligent control module 11 will inquiry the function configuration unit 110 according to all function codes 310 of the multiple function modules 3, so as to respectively obtain each image requirement 1101 of each connected function module 3.

In the embodiment, if the expanding appliance 1 is simultaneously connected with multiple function modules 3, the intelligent control module 11 may generate the demanding command according to the multiple image requirements 1101 correspondingly. Accordingly, the image capturing module 12 may control the image input device 2 to capture the image data with proper specification and perform necessary image pre-process to generate one or more computation data according to the demanding command, so as to ensure that these generated computation data satisfy each image requirement 1101 of each function module 3. It is worth saying that different function modules 3 are all having different function codes 310, but they may have same image requirement 1101, thus the amount of the image requirements 1101 adopted by the intelligent control module 11 may differ from the amount of the connected function modules 3.

In the aforementioned embodiment, the expanding appliance 1 may display the identified result of the function module 3 through the display device 4 connected with the result displaying module 16. If the expanding appliance 1 is simultaneously connected with multiple function modules 3, the display device 4 may be used to respectively display all different identified results for each function module 3. In another embodiment, the expanding appliance 1 may further integrate multiple identified results of multiple function modules 3 that are interactive with each other, and display an integrated final result on the display device 4; therefore the users may easily understand the content of the identification result. Besides, for ensuring that the integrated final result is correct, the expanding appliance 1 has to keep time synchronism among the multiple function modules 3 that are interactive with each other and have an interaction relationship.

Figure 7:
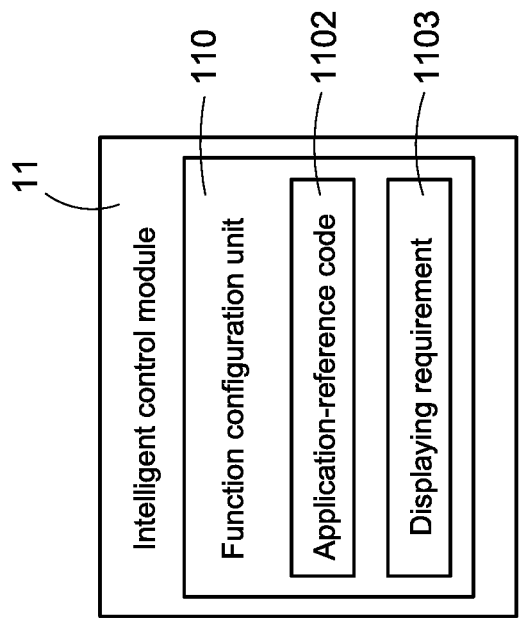
FIG. 7 is a first embodiment of a block diagram showing an intelligent control module of the present invention.

FIG. 7 is a first embodiment of a block diagram showing an intelligent control module of the present invention. As shown in FIG. 7, the function configuration unit 110 may further record the application-reference code 1102, the application-reference code 1102 indicates the interaction relationship among multiple function modules 3 (including all the function modules 3 that are connected and not connected yet). For example, the human face identification function module may have the interaction relationship with the human traffic counting function module and the behavior detecting function module, but doesn't have the interaction relationship with the license plate identification function module.

If the expanding appliance 1 is simultaneously connected with multiple function modules 3, it may inquiry the application-reference code 1102 according to the function codes 310 of the multiple connected function modules 3, so as to determine if there're two or more than two function modules 3 that are interactive with each other and have the interaction relationship. If the intelligent control module 11 determines that there are two or more function modules 3 having the interaction relationship after inquiring the application-reference code 1102, it may then perform a time-synchronism process on these function modules 3 by the image transmitting module 15. By performing the time-synchronism process, these function modules 3 that are interactive with each other may operate on the same time basis.

As shown in FIG. 7, the function configuration unit 110 further stores a displaying requirement 1103 corresponding to the application-reference code 1102, wherein the displaying requirement 1103 indicates a displaying format of the identified results generated by the two or more function modules 3 having the interaction relationship.

In the embodiment, if the expanding appliance 1 receives the identified result from each of the function modules 3 respectively through the image transmitting module 15 (for example, the step S20 of FIG. 3 or the step S40 of FIG. 5 is performed), and these function modules 3 are interactive with one another, the intelligent control module 11 may first obtain the displaying requirement 1103 corresponding to the application-reference code 1102, and trigger the result display module 16 according to the obtained displaying requirement 1103, so the result display module 16 may display the identified results of these function modules 3 on the display device 4 in a combination way, wherein the combination way of displaying the identified results satisfies the content of the displaying requirement 1103.

For example, the expanding appliance 1 may be simultaneously connected to the human face identification function module and the human traffic counting function module that are having the interaction relationship. If the human traffic counting function module identifies ten persons from the image data (or the computation data) at PM 17:25, and the human face identification function module identifies the CEO of the company from the image data (or the computation data) at PM 17:25, the intelligent control module 11 may trigger the result displaying module 16 according to the displaying requirement 1103 correspondingly to display a warning message that indicates like "the CEO and nine others are coming to the office" on the display device 4.

For another example, the expanding appliance 1 may be simultaneously connected to the human face identification function module and the behavior detecting function module that are having the interaction relationship. If the behavior detecting function module identifies an action of throwing goods from the image data (or the computation data) at AM 10:30, but the human face identification function module fails to identify any registered face from the image data (or the computation data) at AM 10:03, the intelligent control module 11 may trigger the result displaying module 16 according to the displaying requirement 1103 correspondingly to display a warning message that indicates like "an unknown object was placed by a suspicious person" on the display device 4.

Figure 8:
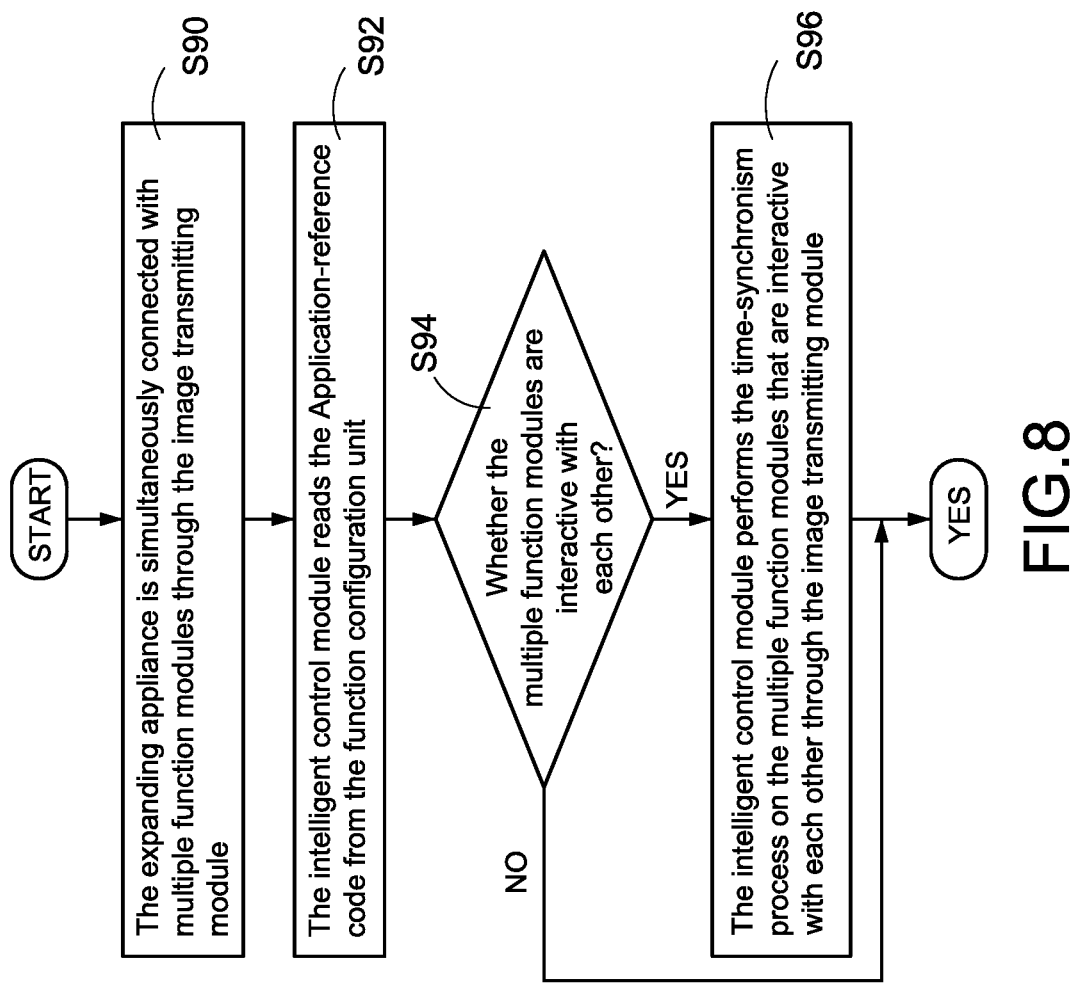
FIG. 8 is a first embodiment of a flowchart showing partial expanding method of the present invention.

FIG. 8 is a first embodiment of a flowchart showing partial expanding method of the present invention. As shown in FIG. 8, the expanding appliance 1 is simultaneously connected with multiple function modules 3 through the image transmitting module 15 (step S90), and the expanding appliance 1 obtains all the function codes 310 of each connected function module 3. Next, the intelligent control module 11 reads the aforementioned application-reference code 1102 from the function configuration unit 110 (step S92) and determines whether the multiple currently-connected function modules 3 are interactive with each other (i.e., whether have an interaction relationship or not) according to the content of the function codes 310 and the application-reference code 1102 (step S94).

As shown in FIG. 8, if the multiple currently-connected function modules 3 are not interactive with each other, the intelligent control module 11 will not perform any additional action (i.e., the intelligent control module 11 will omit the aforementioned time-synchronism process). If two or more function modules 3 connected thereto are interactive with each other, the intelligent control module 11 may perform the aforementioned time-synchronism process on the two or more function modules 3 that are interactive with each other through the image transmitting module 15 (step S96). It should be mentioned that the intelligent control module 11 may perform the time-synchronism process only when a new function module 3 is connected and detected, otherwise the intelligent control module 11 may perform the time-synchronism process regularly for keeping the time basis of the multiple function modules 3 synchronized.

Figure 9:
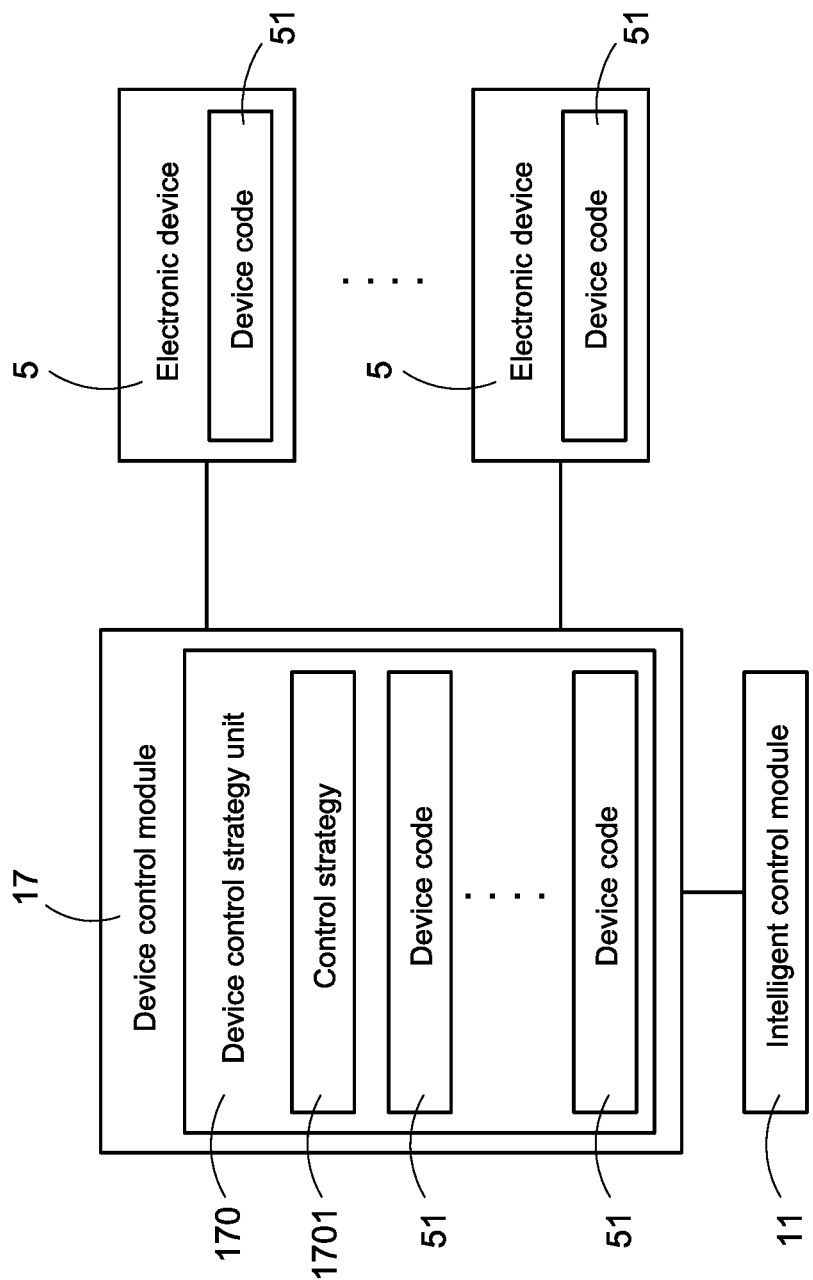
FIG. 9 is a fourth embodiment of a block diagram showing the expanding appliance of the present invention.

FIG. 9 is a fourth embodiment of a block diagram showing the expanding appliance of the present invention. As shown in FIG. 9, the device control module 17 may include a device control strategy unit 170, the device control strategy unit 170 records a control strategy 170 and a device code 51 of each electronic device 5. It is worth saying that the device control strategy unit 170, in other embodiment, may be independently arranged outside the device control module 17, and the device control strategy unit 170 may be arranged in the intelligent control module 11, or be integrated into a union with the function configuration unit 110, not limited thereto.

After being connected with one or more electronic devices 5 through the device control module 17, the expanding appliance 1 may obtain the device code 51 of each connected electronic device 5 therefrom. Therefore, the intelligent control module 11 may recognize the type of each connected electronic device 5 via the device code 51. For example, the device code 51 of a light may be "5101", the device code 51 of an air-conditioning may be "5102", and so on.

In the present invention, the device control module 17 may be connected with one or more electronic devices 5 through multiple input/output slots (wired slots and/or wireless connections). If the users are willing to increase the amount or types of the electronic devices 5 which may be connected and supported by the expanding appliance 1, all they have to do is performing settings on the device control strategy unit 170 by adding the device code 51 of a new electronic device 5 to the device control strategy unit 170, thus the convenience and flexibility of using the expanding appliance 1 is easily improved.

In the embodiment, the intelligent control module 11 may receive the identified result generated and sent from the function module 3, and inquiry the control strategy 1701 according to received identified result, and the intelligent control module 11 may then generate the aforementioned control command according to an inquiring result, wherein the control command here may indicate the device code 51 of one or more electronic devices 5 needed to be controlled, and a task should be executed by these electronic devices 5. Therefore, the device control module 17 may receive the control command generated by the intelligent control module 11, and control the corresponding one or more electronic devices 5 to respectively execute corresponding operations according to the content of the control command.

For an example, if the human traffic counting function module identifies ten persons from the image data (or the computation data), the intelligent control module 11 may generate the control command according to the identified result, and the device control module 17 may turn on the lights according to the content of the control command. For another example, if the human traffic counting function module identifies ten persons from the image data (or the computation data), and meanwhile the human face identification function module identifies the CEO of the company from the image data (or the computation data), the intelligent control module 11 may generate a corresponding control command based on the combination of these two identified results, and the device control module 17 may simultaneously activate the lights and the air-conditioning according to the content of the control command.

It is worth saying that the control strategy 1701 may further record an abnormal process mechanism. For example, when one of the connected electronic devices 5 replies to the expanding appliance 1 with an abnormal situation (e.g., the temperature of the office replied by the air-conditioning is too high), the intelligent control module 11 may control a specific electronic device 5 to execute a corresponding operation according to the abnormal process mechanism, such as controlling a warning light to shine, controlling a broadcast equipment to make a voice warning, controlling a communication device to send SMS or e-mail to the staff, etc. For another example, if the apparatus control module 17 detects that one of the connected electronic devices 5 is abnormal itself (e.g., the electronic device 5 is powered off or malfunctioned), the intelligent control module 11 may perform a warning procedure or a notifying procedure according to the above abnormal process mechanism. By adopting the aforementioned control strategy 1701, the expanding appliance 1 of the present invention may effectively perform error detection and debugging for the environment and/or the electronic devices 5.

Besides, the control strategy 1701 may further record an operating schedule of each electronic device 5. The intelligent control module 11 may regularly control a specific one or more electronic devices 5 to perform specific operations according to the content of the control strategy 1701, for example, it may regularly turn on the air-conditioning at AM 10:00 and turn off the air-conditioning at PM 05:00 on every working day. Furthermore, if the users or administrators intend to add, adjust or delete the operating schedule of each electronic device 5, all they have to do is renewing the content of the control strategy 1701, thus the convenience of using the expanding appliance 1 is further improved.

FIG. 10 is a first embodiment of an operation timing diagram of the present invention. When using the expanding appliance 1 of the present invention, at least one function module 3 is first connected to the image transmitting module 15 of the expanding appliance 1 by the user (step S50). It should be noted that the expanding appliance 1 is executing each type of image identification procedure via each connected function module 3, if no function module 3 is connected thereto, the intelligent control module 11 of the expanding appliance 1 will directly display the image data captured by the image input device 2 on the display device 4 without performing any process.

If the function module 3 is activated and successfully connected to the image transmitting module 15, the image transmitting module 15 may send a message for indicating the successful connection of the function module 3 to the intelligent control module 11 (step S52). Next, the intelligent control module 11 obtains the image input parameters demanded by the function module 3 (for example, the intelligent control module 11 may obtain the image requirement 1101 corresponding to the function module 3 from the function configuration unit 110), so as to generate a corresponding demanding command according to the image input parameters and sends the demanding command to the image capturing module 12 (step S54).

Next, the image capturing module 12 may adjust the image input parameters of the image input device 2 according to the demanding command (step S56), and the image input device 2 may capture the image data according to the adjusted image input parameters and provides the captured image data to the image capturing module 12 (step S58). The image capturing module 12 may perform the image pre-process on the image data, sample the image data, quantize the samples of the image data as computation data and store the computation data to the image register 14 (step S50). In the meantime, the image capturing module 12 may notify the intelligent control module 11 with a message indicating that the computation data is ready (step S62).

After the step S62, the intelligent control module 11 may allow the image transmitting module 15 to start providing the computation data to the function module 3 (step S64). After being allowed, the image transmitting module 15 obtains the computation data from the image register 14 and provides the computation data to the function module 3 (step S66). After receiving the computation data, the function module 3 may immediately execute its image identification procedure, generate the identified result after completing the image identification procedure, and reply to the image transmitting module 15 with the identified result.

After receiving the identified result, the image transmitting module 15 may first determine the validity of the received identified result (for example, determines if the identified result indicates a wrong message, or if the identified result indicates a value exceeding an effective range), and then only convey valuable identified result to the intelligent control module 11 (step S70). Next, the intelligent control module 11 may trigger the result displaying module 16 according to the identified result (step S72), generate the control command according to the identified result, and output the control command to the apparatus control module 17 (step S74). Therefore, the result displaying module 16 may schedule the identified result to be displayed on the display device 4 (step S76), and the apparatus control module 17 may control a corresponding electronic device 5 to perform corresponding operations (step S78).

By using the expanding appliances 1, 1' of the present invention, the users may easily connect and expand different types of function modules 3 and electronic devices 5, so as to improve the flexibility and convenience of using the expanding appliances 1, 1', and can further make the expanding appliances 1, 1' to be more satisfying the real user demands of image identification and device controlling.

As the skilled person will appreciate, various changes and modifications can be made to the described embodiment. It is intended to include all such variations, modifications and equivalents which fall within the scope of the present invention, as defined in the accompanying claims.

What is claimed is:

1. An expanding appliance for image identifying modules, for expanding identification function of an image input device, comprising:
   a connect port, connected with the image input device which is configured to capture an image data;
   an image register;
   an image capturing module, connected with the connect port and the image register, configured to sample the image data captured by the image input device for producing samples and to quantize the samples as at least one computation data, and configured to store the computation data to the image register;
   an image transmitting module, connected with the image register and at least one function module, wherein the function module has an independent computing unit and is configured to execute a unique image identification procedure;
   an intelligent control module, connected with the image capturing module and the image transmitting module, configured to generate at least one demanding command corresponding to the at least one function module connected to the image transmitting module, and configured to control the image capturing module to obtain the image data satisfying at least an image requirement of the at least one function module according to the at least one demanding command; and
   a result displaying module, connected with the intelligent control module;
   wherein the image transmitting module is configured to receive an identified result generated by the function module via executing the image identification procedure according to the computation data, and the image transmitting module is configured to convey the identified result to the intelligent control module for the intelligent control module to trigger the result displaying module for displaying the identified result;

wherein the image capturing module is configured to sample the image data according to the at least one demanding command and to perform an image pre-process on the image data for quantizing the samples as the at least one computation data required by the at least one function module, wherein the at least one computation data is able to be directly identified by the image identification procedure of the at least one function module.

2. The expanding appliance in claim 1, wherein the at least one function module comprises a storage unit stored a function code, the function code is corresponding to a type of the image identification procedure, the image transmitting module is configured to obtain the function code from the at least one function module for conveying to the intelligent control module, and the intelligent control module is configured to generate the demanding command that is corresponding to the at least one function module according to the function code.

3. The expanding appliance in claim 2, wherein the intelligent control module comprises a function configuration unit stored the function code and the at least one image requirement of the at least one function module.

4. The expanding appliance in claim 3, wherein the intelligent control module is configured to inquire the function configuration unit according to the function code for correspondingly obtaining the image requirement and generates the demanding command according to the obtained image requirement.

5. The expanding appliance in claim 3, wherein the image transmitting module is correspondingly connected to multiple function modules, each of the function modules respectively has different function code and is configured to execute different type of the image identification procedure, the function configuration unit is configured to store multiple function codes respectively corresponding to the multiple function modules, and store multiple image requirements respectively corresponding to the multiple function codes, the intelligent control module is configured to inquire the function configuration unit according to the multiple function codes for obtaining the multiple image requirements respectively corresponding to the multiple function modules and generates the demanding command according to the multiple image requirements, and the image capturing module is configured to control the image input device to capture the image data with proper specification and perform necessary image pre-process to generate multiple computation data respectively corresponding to the multiple image requirements according to the demanding command.

6. The expanding appliance in claim 5, wherein the function configuration unit is configured to store an application-reference code, the intelligent control module is configured to read the application-reference code for determining whether two or more of the multiple function modules are interactive with each other and have an interaction relationship, and the image transmitting module is configured to perform a time-synchronism process on the two or more function modules when the two or more function modules are determined having the interaction relationship.

7. The expanding appliance in claim 6, wherein the function configuration unit is configured to store a displaying requirement corresponding to the application-reference code, the intelligent control module is configured to receive multiple identified results respectively generated by the two or more function modules having the interaction relationship via independently executing the image identification procedure, and the intelligent control module is further configured to control the result displaying module to display the multiple identification results in a combination way according to the displaying requirement.

8. An expanding appliance for image identifying modules, for expanding controlling function of an image input device, comprising:
   a connect port, connected with the image input device which is configured to capture an image data;
   an image register;
   an image capturing module, connected with the connect port and the image register, configured to sample the image data captured by the image input device for producing samples and to quantize the samples as at least one computation data, and configured to store the computation data to the image register;
   an image transmitting module, connected with the image register and at least one function module, wherein the function module has an independent computing unit and is configured to execute a unique image identification procedure;
   an intelligent control module, connected with the image capturing module and the image transmitting module, configured to generate at least one demanding command corresponding to the at least one function module connected to the image transmitting module, and configured to control the image capturing module to obtain the image data satisfying at least an image requirement of the at least one function module according to the at least one demanding command; and
   a device control module, connected with the intelligent control module and at least one electronic device;
   wherein the image transmitting module is configured to receive an identified result generated by the function module via executing the image identification procedure according to the computation data, and configured to convey the identified result to the intelligent control module, and the intelligent control module is configured to generate a control command according to the identified result and uses the control command to trigger the device control module correspondingly controlling the electronic device;
   wherein the image capturing module is configured to sample the image data according to the at least one demanding command and to perform an image pre-process on the image data for quantizing the samples as the at least one computation data required by the at least one function module, wherein the at least one computation data is able to be directly identified by the image identification procedure of the at least one function module.

9. The expanding appliance in claim 8, wherein the device control module is connected with multiple electronic devices and comprises a device control strategy unit, the device control strategy unit is configured to store a control strategy and a device code of each of the electronic devices, and the intelligent control module is configured to inquire the control strategy according to the identified result and generates the control command according to an inquiring result, wherein the control command is generated to at least indicate the device code of one or more of the electronic devices needed to be controlled.

10. The expanding appliance in claim 8, wherein the at least one function module comprises a storage unit stored a function code, the function code is corresponding to a type of the image identification procedure, the image transmitting module is configured to obtain the function code from the at least one function module for conveying to the intelligent control module, and the intelligent control module is configured to generate the at least one demanding command that is corresponding to the at least one function module according to the function code.

11. The expanding appliance in claim 10, wherein the intelligent control module comprises a function configuration unit stored the function code and the at least one image requirement of the at least one function module, the intelligent control module is configured to inquire the function configuration unit according to the function code for correspondingly obtaining the at least one image requirement and generates the at least one demanding command according to the obtained image requirement, and the image capturing module is configured to control the image input device to capture the image data that is satisfying the at least one image requirement according to the at least one demanding command.

12. The expanding appliance in claim 11, wherein the image transmitting module is correspondingly connected to multiple function modules, each of the function modules respectively has different function code and is configured to execute different type of the image identification procedure, the function configuration unit is configured to store multiple function codes respectively corresponding to the multiple function modules, and stored multiple image requirements respectively corresponding to the multiple function codes, the intelligent control module is configured to inquire the function configuration unit according to the multiple function codes for obtaining the multiple image requirements respectively corresponding to the multiple function modules and generates the demanding command according to the multiple image requirements, and the image capturing module is configured to control the image input device to capture the image data with proper specification and perform necessary image pre-process to generate multiple computation data respectively corresponding to the multiple image requirements according to the demanding command.

13. The expanding appliance in claim 12, wherein the function configuration unit is configured to store an application-reference code, the intelligent control module is configured to read the application-reference code for determining whether two or more of the multiple function modules are interactive with each other and have an interaction relationship, and the image transmitting module is configured to perform a time-synchronism process on the two or more function modules when the two or more function modules are determined having the interaction relationship.

14. An expanding method of an expanding appliance, wherein the expanding appliance comprises a connect port connected with an image input device, and an image capturing module connected with the connect port, and an image register, an image transmitting module, an intelligent control module, and a result displaying module, the expanding method comprising following steps:
  a) connecting at least one function module through the image transmitting module;
  b) generating at least one demanding command corresponding to the at least one function module by the intelligent control module connected to the image transmitting module, wherein the at least one function module executes a unique image identification procedure by an independent computing unit;
  c) controlling the image input device by the image capturing module to obtain an image data satisfying at least an image requirement of the at least one function module according to the at least one demanding command;
  d) sampling the image data for producing samples according to the at least one demanding command and performing an image pre-process on the image data for quantizing the samples as at least one computation data required by the at least one function module, and storing the computation data to the image register by the image capturing module;
  e) obtaining the computation data from the image register and transmitting the computation data to the function module by the image transmitting module, wherein the at least one computation data is able to be directly identified by the image identification procedure of the at least one function module;
  f) receiving an identified result generated by the at least one function module via executing the image identification procedure according to the computation data by the image transmitting module; and
  g) receiving the identified result from the image transmitting module at the intelligent control module, and triggering the result displaying module according to the identified result for the result displaying module to display the identified result.

15. The expanding method in claim 14, wherein the intelligent control module comprises a function configuration unit stored with a function code and at least an image requirement of the at least one function module, and the function code is corresponding to a type of the image identification procedure, wherein the step b) is to obtain the function code of the at least one function module by the image transmitting module and transmits the function code to the intelligent control module, and the intelligent control module inquiries the function configuration unit according to the function code for correspondingly obtaining the at least one image requirement and generates the at least one demanding command that is corresponding to the at least one function module according to the at least one image requirement.

16. The expanding method in claim 15, wherein the step a) is to connect multiple function modules through the image transmitting module, wherein each of the multiple function modules is respectively executing different type of the image identification computation and having different function code, the step b) is to inquire the function configuration unit according to the multiple function codes by the intelligent control module for obtaining multiple image requirements respectively corresponding to the multiple function modules and generates the demanding command according to the multiple image requirements, and the step c) is to control the image input device to capture the image data with proper specification and perform necessary image pre-process to generate multiple computation data respectively corresponding to the multiple image requirements by the image capturing module according to the demanding command.

17. The expanding method in claim 16, further comprising the following steps after the step a):
  a01) reading an application-reference code from the function configuration unit by the intelligent control module;
  a02) determining whether two or more of the multiple function modules are interactive with each other and have an interaction relationship by the intelligent control module according to the application-reference code; and
  a03) performing a time-synchronism process on the two or more function modules by the intelligent control module through the image transmitting module when determining that the two or more function modules do have the interaction relationship.

18. The expanding method in claim 17, wherein the step g) comprises following steps:
   g1) reading a displaying requirement corresponding to the application-reference code from the function configuration unit by the intelligent control module;
   g2) receiving multiple identified results respectively generated by the two or more function modules having the interaction relationship via independently executing the image identification computation by the intelligent control module (11) through the image transmitting module; and
   g3) controlling the result displaying module to display the multiple identification results in a combination way according to the displaying requirement by the intelligent control module.

19. The expanding method in claim 15, wherein the expanding appliance comprises a device control module for connecting at least one electronic device, and the expanding method further comprises a step h): generating a control command according to the identified result by the intelligent control module for triggering the device control module to correspondingly control the electronic device.

20. The expanding method in claim 19, wherein the device control module is connected with multiple electronic devices, and the device control module comprises a device control strategy unit stored with a control strategy and a device code of each of the multiple electronic devices, wherein the step h) is to inquire the control strategy according to the identified result and generates the control command according to an inquiring result by the intelligent control module, wherein the control command at least indicates the device code of one or more of the electronic devices needed to be controlled.

* * * * *